(12) United States Patent
Kaddeche

(10) Patent No.: US 10,304,492 B2
(45) Date of Patent: May 28, 2019

(54) ACTIVE CONTROL OF A READ/WRITE HEAD

(71) Applicant: L2 Drive Inc., Yorba Linda, CA (US)

(72) Inventor: Karim Kaddeche, Irvine, CA (US)

(73) Assignee: L2 Drive Inc., Yorba Linda, CA (US)

( * ) Notice: Subject to any disclaimer, the term of this patent is extended or adjusted under 35 U.S.C. 154(b) by 0 days.

(21) Appl. No.: 15/848,685

(22) Filed: Dec. 20, 2017

(65) Prior Publication Data

US 2018/0130495 A1 May 10, 2018

Related U.S. Application Data

(63) Continuation of application No. 15/621,593, filed on Jun. 13, 2017, now Pat. No. 9,881,644, which is a continuation of application No. 15/405,738, filed on Jan. 13, 2017, now Pat. No. 9,734,864, which is a continuation of application No. 15/194,833, filed on Jun. 28, 2016, now Pat. No. 9,666,229.

(60) Provisional application No. 62/295,681, filed on Feb. 16, 2016.

(51) Int. Cl.
*G11B 5/09* (2006.01)
*G11B 21/21* (2006.01)
*G11B 5/48* (2006.01)
*G11B 5/58* (2006.01)
*G11B 5/60* (2006.01)

(52) U.S. Cl.
CPC ............ *G11B 21/21* (2013.01); *G11B 5/4833* (2013.01); *G11B 5/58* (2013.01); *G11B 5/6017* (2013.01); *G11B 5/6058* (2013.01)

(58) Field of Classification Search
None
See application file for complete search history.

(56) References Cited

U.S. PATENT DOCUMENTS

| | | |
|---|---|---|
| 3,706,861 A | 12/1972 | Giel |
| 4,605,977 A | 8/1986 | Matthews |
| 4,631,611 A | 12/1986 | Schneider |
| 4,669,011 A | 5/1987 | Lemke |
| 4,931,887 A | 6/1990 | Hegde et al. |
| 4,996,622 A * | 2/1991 | Takatsuki ................ G11B 5/82 360/135 |
| 5,082,827 A | 1/1992 | Barnes |

(Continued)

FOREIGN PATENT DOCUMENTS

JP S60237620 A 11/1985

OTHER PUBLICATIONS

International Search Report and Written Opinion of the International Searching Authority dated Nov. 10, 2016 for International Application No. PCT/US2016/039787 (9 Pages).

(Continued)

*Primary Examiner* — Peter Vincent Agustin
(74) *Attorney, Agent, or Firm* — Brown Rudnick LLP

(57) ABSTRACT

The invention generally relates to hard disk drives with a disk and a read/write head, and methods for preventing contact between the disk and the read/write head. The hard disk drive includes a z-axis actuator configured to control movement of the read/write head, and to prevent contact between the read/write head and the disk, based on signals from a controller that indicate when the distance between the read/write head and the disk are outside a predetermined range, such as between 0 and 10.0 nm.

5 Claims, 8 Drawing Sheets

(56) References Cited

U.S. PATENT DOCUMENTS

| | | | |
|---|---|---|---|
| 6,624,981 B1* | 9/2003 | Vigna | G11B 5/484 360/244.2 |
| 6,859,346 B1 | 2/2005 | Meyer | |
| 6,950,266 B1 | 9/2005 | McCaslin et al. | |
| 7,310,195 B1* | 12/2007 | Schreck | G11B 5/6005 360/75 |
| 7,369,348 B2 | 5/2008 | Strom et al. | |
| 7,400,473 B1 | 7/2008 | Krajnovich et al. | |
| 7,436,620 B1* | 10/2008 | Kang | G11B 5/6005 360/31 |
| 7,564,649 B2 | 7/2009 | Hanchi et al. | |
| 7,675,707 B1 | 3/2010 | Liu et al. | |
| 7,729,079 B1 | 6/2010 | Huber | |
| 7,760,463 B2 | 7/2010 | Ward et al. | |
| 7,808,746 B2 | 10/2010 | Burbank et al. | |
| 8,139,306 B2 | 3/2012 | Feng et al. | |
| 8,284,524 B2 | 10/2012 | Meyer | |
| 8,310,779 B2 | 11/2012 | Hanchi et al. | |
| 8,804,275 B1* | 8/2014 | Mate | G11B 5/6029 360/31 |
| 8,837,070 B1 | 9/2014 | Johnson et al. | |
| 8,837,075 B2 | 9/2014 | Hanchi et al. | |
| 8,947,822 B1 | 2/2015 | Rice et al. | |
| 8,988,816 B1* | 3/2015 | Yamasaki | G11B 5/6076 360/31 |
| 9,650,266 B2 | 5/2017 | Huang | |
| 9,659,594 B2 | 5/2017 | Meyer | |
| 9,666,229 B1* | 5/2017 | Kaddeche | G11B 5/4833 |
| 9,734,864 B1* | 8/2017 | Kaddeche | G11B 5/4833 |
| 9,881,644 B2* | 1/2018 | Kaddeche | G11B 5/4833 |
| 2002/0044371 A1 | 4/2002 | Bement et al. | |
| 2007/0047143 A1 | 3/2007 | Matsumoto | |
| 2009/0128951 A1 | 5/2009 | Guo | |
| 2009/0154010 A1* | 6/2009 | Ooeda | G11B 5/725 360/110 |
| 2010/0265618 A1 | 10/2010 | Boutaghou et al. | |
| 2011/0242706 A1* | 10/2011 | Sakurai | B82Y 10/00 360/264.1 |
| 2013/0083423 A1* | 4/2013 | Shiroishi | G11B 5/3146 360/75 |
| 2013/0188273 A1 | 7/2013 | Miyamoto et al. | |
| 2013/0250455 A1* | 9/2013 | Zeng | G11B 5/455 360/234.3 |
| 2017/0236542 A1* | 8/2017 | Kaddeche | G11B 5/4833 360/75 |
| 2017/0278542 A1* | 9/2017 | Kaddeche | G11B 5/4833 |
| 2018/0130495 A1* | 5/2018 | Kaddeche | G11B 5/4833 |

OTHER PUBLICATIONS

Jefferson, M. "A Variable Head to Disk Spacing Controller for Magnetic Recording on Rigid Disks," IEEE Transactions on Magnetics, vol. 24, No. 6, 1988 (3 Pages).

* cited by examiner

ACTIVE CONTROL OF A READ/WRITE HEAD

CROSS-REFERENCE TO RELATED APPLICATIONS

This is a continuation of U.S. Nonprovisional application Ser. No. 15/621,593, filed Jun. 13, 2017, which is a continuation of U.S. Nonprovisional application Ser. No. 15/405,738, filed Jan. 13, 2017 (now U.S. Pat. No. 9,734,864), which is a continuation of U.S. Nonprovisional application Ser. No. 15/194,833, filed Jun. 28, 2016 (now U.S. Pat. No. 9,666,229), which claims the benefit of, and priority to, U.S. Provisional Application Ser. No. 62/295,681, filed Feb. 16, 2016. The entirety of the contents of each of these applications is incorporated herein by reference.

FIELD

The present disclosure relates generally to magnetic data storage systems and devices, and, more particularly, to a system for achieving reduced head-media spacing (HMS) in a hard disk drive (HDD) by providing active control over positioning of a read/write head relative to a rotating magnetic data recording and reading surface of a disk.

BACKGROUND

A hard disk drive (HDD), also referred to as a "hard disk", a "hard drive" or "fixed disk", is a data storage device used for storing and retrieving digital information using one or more rapidly rotating disks or platters coated with magnetic material. The platters are paired with magnetic heads arranged on a moving actuator arm. The magnetic heads are configured to read and write data to the disk surfaces. When an HDD is in operation, each disk is rapidly rotated by a spindle system and data is read from and/or written to a disk using one or more read/write heads positioned over a specific location of the disk by the actuator.

A read/write head uses a magnetic field to read data from and write data to the surface of a disk. As a magnetic dipole field decreases rapidly with distance from a magnetic pole, the distance between a read/write head and the surface of the disk must be tightly controlled. Current systems attempt to control head-media spacing or separation (HMS) between the head and disk surface so as to maintain head as close as possible to a rotating disk for effective operation of the HDD. As used herein, HMS generally refers to the total distance between the read/write head and the disk surface. HMS may include, for example, not only the flying height of the read/write head relative to the disk surface, but also thicknesses of all coating or lubrication layers on either of the read/write head or disk surface.

The HMS between a head and disk surface is a critical factor for determining the amount of information that can be written to and/or read from a disk, sometimes referred to as an areal bit density (number of bits/unit area on a disk surface). For example, as the separation between the head and the surface of the disk increases, the effectiveness of both reading data from and writing to the disk decreases. Thus, a larger HMS between the head and disk surface requires larger bit cells, thereby resulting in smaller areal density for recorded information. Conversely, a smaller HMS between the head and disk allows for smaller bit cells, thereby allowing for greater areal density for information recording. Increasing the areal density increases the total storage capacity of the disk drive, while decreasing the areal density decreases the total storage capacity.

There are existing systems that attempt to control the flying height of the read/write head so as to decrease the HMS for improving the operation of the HDD and increasing storage capacity. For example, some disk drives rely on an air bearing surface (ABS) configuration, wherein the separation between the read/write head and the disk is maintained as the result of the balance between the aerodynamic lift provided by the fast moving air generated by a disk's rotation, and the down force applied to a slider holding the head by the load beam portion of the actuator arm.

A further refinement to the ABS design is referred to as a thermal flying height control (TFC) design. In a TFC design, the slider includes an electrical resistor placed near the magnetic transducer of the head and, when activated, produces a temperature rise near the transducer causing the transducer to protrude towards the disk surface. Although the general flying height of the slider remains unchanged by the TFC, the magnetic transducer is brought even closer to the disk surface by several nanometers. When power to the heater is reduced or terminated, the heat quickly dissipates to the rest of the slider and the protrusion retracts. The cycle of heating and cooling can be repeated thousands of times per second. Although a TFC design allows for subtle movement of the head closer to the disk surface by a few nanometers, the TFC design relies on the flexible load beam and the ABS design, which generally acts over a range of hundreds of nanometers in the z-direction from the head to the disk surface.

Current systems and designs for controlling HMS between the read/write head and disk surface have shortcomings and thus impact overall performance of the HDD. For example, the ABS design fails to fully prevent contact between the head and disk surface during operation of the HDD. In particular, as part of the ABS design, the head area of the slider is gently urged toward the disk until contact is made ("touchdown"), at which point the slider is urged away from the disk ("pull-back"). Contact between the head and disk surface may also occur due to internal and external vibrations directly to the HDD, as well as the fluttering of the disk that may occur as a result of fluctuations in air flow within the HDD. The act of contacting the disk causes mechanical wear of the head which, over time, often leads to operational degradation and eventually failure. In order to guard against potential damage from intermittent contact with one another, the disk surfaces are generally coated with at least two layers; a first hard coating and a second lubricant coating. In addition, the heads themselves may also be coated with a hard coating to provide additional protection. Although the hard coatings and lubricant layers may provide protection, they also increase the HMS between the head and disk surface, thereby presenting a challenge when attempting to reduce HMS values and limiting the ability to increase areal densities for improving reading and storage capabilities.

Another drawback of the ABS design is the turbulence within the HDD as a result of high-speed air generated by the rotation of the disk. The air turbulence causes a "windage" effect, which can result in disk fluttering, as well as slight movement of the actuator arm, both of which can result in the head missing a desired track on the disk surface, commonly referred to as track miss-registration (TMR). Thus, TMR further reduces the reliability and performance of an HDD.

SUMMARY

The demand for higher areal densities in hard HDDs has been consistently increasing, as higher areal density allows for increased storage capacity of a disk and further improves data reading from the disk. The present invention relates to a system for achieving higher areal densities by providing reduced head-media spacing or separation (HMS). In particular, the system of the present disclosure is configured to monitor the position of a read/write head relative to a disk surface and actively control positioning of the read/write head within a relatively tight HMS tolerance (e.g., between 1.0 nm and 10.0 nm, and, in some instances, 4.3 nm) between the head and disk surface while ensuring contact between the head and disk surface is prevented.

The system of the present disclosure replaces the conventional ABS design with a fully active actuator assembly including a z-axis actuator configured to support and move a read/write head in a direction substantially orthogonal relative to the disk surface. In other words, the z-axis actuator is configured to move the read/write head in a z-direction towards or away from the disk surface. The z-direction is substantially parallel to a z-axis oriented substantially orthogonal to the disk surface. The z-axis may generally be parallel to the axis of rotation of the disk.

The system includes a controller configured to monitor the HMS between the read/write head relative to the disk surface and transmit control signals to the z-axis actuator to cause movement of the read/write head in the event that the read/write head is positioned outside of a desired HMS range of values. In particular, the controller may be configured to receive and process measurement data, including one or more measurements of a flying height of the read/write head relative to the disk surface during disk rotation. Based on the measurement data, the controller may be configured to determine the position of the read/write head and whether the position of the read/write head falls outside of a set HMS range of values. Thus, the controller may be referred to herein as a "servo controller", in that the controller is a servomechanism utilizing error-sensing negative feedback to correct the performance of a mechanism (e.g., adjust the position of the read/write head). Accordingly, the system of the present disclosure is configured to actively control the flying height of the head above the disk surface at all times, thereby ensuring that the head remains within a desired HMS range during operation while also ensuring that the head never makes contact with the disk surface.

The system of the present disclosure provides numerous advantages. For example, by providing fully active control over a z-axis actuator and ensuring that contact between the read/write head and disk surface never occurs, the protective hard coating and lubrication layers customarily applied to the disk and head surfaces can be eliminated, or, at the very least, the disk and read/write head surfaces may include a significantly small amount of hard coating or lubrication layer (e.g., coating or layer having a thickness in the range of 0.1 nm to 2.0 nm). The elimination of, or reduction in the thickness of, such layers results in a significant reduction in the HMS between the head and disk surface, thereby allowing for increased areal density to be achieved. Additionally, since all physical contact between the head and the disk surface is eliminated, a HDD incorporating the system of the present disclosure will have reduced wear and tear and have a much longer operating life than current hard disk drive units.

Additionally, because the system does not rely on an ABS design, air within the HDD is no longer required as the actuator design of the present invention does not rely on aerodynamic forces to maintain the flying height of the head. Accordingly, a low air pressure environment, including a zero, or near-zero, air pressure may be maintained within the HDD enclosure, thereby eliminating substantially all aerodynamic drag and turbulence that are major causes of head and disk surface contact, disk flutter, TMR, and power consumption. Additionally, or alternatively, in some embodiments, any oxygen remaining within the HDD enclosure may be purged and replaced with an inert gas, such as nitrogen or helium, which may improve the longevity and operation of components within the HDD enclosure. For example, typical HDDs may include oxygen within the enclosure, which can lead to oxidation of the HDD components which may affect performance and reliability. Accordingly, purging the HDD enclosure of oxygen and replacing with an inert gas prevent HDD components from being exposed to oxygen.

Another advantage of eliminating the ABS design relates to the fact that the read/write heads consistent with the present disclosure do not require air bearing sliders, which can be the single-most expensive component of an HDD due to the time-intensive manufacturing processes and costs involved. Air bearing sliders are generally made from aluminum oxide/titanium carbide ($Al_2O_3$/TiC), as this material is ideal for making sliders with smooth faces and sharp edges. However, such material is incompatible with most common semi-conductor manufacturing processes and, as a result, these manufacturing processes must be altered to accommodate the aluminum oxide/titanium carbide material, which is time intensive and results a loss of useable space on the substrate. The system of the present invention allows for the manufacture of heads using a silicon (Si) substrate from a Si wafer, wherein such a material is much more compatible with most common semi-conductor manufacturing processes and equipment. The system allows for large gains in magnetic head manufacturing efficiencies to be obtained by reducing the size of the head and increasing the number of heads that can be produced on any given Si substrate in that the Si wafer has a size of approximately 300 mm, which is much greater than a typical 200 mm size of an $Al_2O_3$/TiC wafer. Thus, there are no lower limits on physical dimensions of a ceramic substrate for thin film transducers for use on the read/write head consistent with the present disclosure. Furthermore, by using a Si-based thin-film head, additional electronic circuitry and components may be added for improving performance, such as, for example, a pre-amplifier circuit for boosting the read/write head signal prior to transmission of the signal over a longer distance to a drive interface.

In one aspect, the invention includes a system for providing reduced head-media spacing (HMS) in a hard disk drive (HDD). The system includes a disk having a magnetic data recording and reading surface and a read/write head having a magnetic transducer configured to read data from or write data to the magnetic surface of the disk. The system further includes a z-axis actuator coupled to the read/write head and configured to control movement of the read/write head in a substantially orthogonal direction relative to the surface of the disk. The system further includes a servo controller in electrical communication with the z-axis actuator and configured to monitor positioning of the read/write head relative to the disk surface during rotation of the disk. The servo controller is configured to cause the z-axis actuator to adjust a position of the read/write head to prevent HMS between the magnetic transducer and the magnetic data recording and reading surface from falling below approximately 1.0 nm and exceeding approximately 10.0 nm.

In some embodiments, the servo controller may be configured to monitor and adjust positioning of the read/write head relative to the disk surface during rotation of the disk to ensure that the magnetic transducer never makes physical contact with the disk surface.

In some embodiments, the servo controller is configured to cause the z-axis actuator to adjust a position of the read/write head to prevent the HMS from exceeding approximately 8.0 nm and falling below approximately 4.0 nm. In some embodiments, the servo controller is configured to maintain a position of the read/write head relative to the disk surface during rotation of the disk such that the HMS is approximately 4.3 nm.

The servo controller may be configured to receive and process measurement data including one or more measurements of a flying height of the magnetic transducer of the read/write head relative to the disk surface during disk rotation. The servo controller may be configured to determine whether the magnetic transducer is positioned within the HMS range of approximately 1.0 nm to approximately 10.0 nm based on the processing of the measurement data. In the event that it is determined that the magnetic transducer is positioned outside of the HMS range, the servo controller is configured to transmit a control signal to the z-axis actuator to cause movement of the read/write head to position the magnetic transducer within the HMS range.

The processing of the measurement data may include a comparison of the measurement data with a set of reference data comprising the HMS range. In the event that it is determined that the magnetic transducer is positioned below the minimum value of the HMS range, the control signal causes the z-axis actuator to move of the read/write head in direction away from the disk surface to position the magnetic transducer within the HMS range. In the event that it is determined that the magnetic transducer is positioned above the maximum value of the HMS range, the control signal causes the z-axis actuator to move the read/write head in direction towards the disk surface to position the magnetic transducer within the HMS range.

In some embodiments, the read/write head may be configured to measure the flying height via a capacitive coupling arrangement between the read/write head and the disk surface. In other embodiments, the z-axis actuator may further include a measurement sensor configured to measure the flying height distance. The measurement sensor may include, for example, a capacitive coupling device.

In some embodiments, the disk, the actuator assembly, and the servo controller are configured to operate in a low air pressure environment within a HDD. For example, in some embodiments, the disk, the actuator assembly, and the servo controller are configured to operate in a zero or near-zero air pressure environment within the HDD. In some embodiments, the system may further include a vacuum pump configured to maintain a zero or near-zero air pressure environment within the HDD.

In some embodiments, the read/write head may include a silicon (Si) substrate configured for supporting the magnetic transducer. The Si substrate may be configured to support one or more active electronic components configured to be coupled to, or in communication with, the magnetic transducer. For example, in one embodiment, the one or more active electronic components may include a pre-amplifier positioned on the Si substrate and in communication with a read element of the magnetic transducer. The pre-amplifier is configured to amplify read signals from the read element of the magnetic transducer. The read element of the magnetic transducer may include one or more inductive elements. Additionally, or alternatively, the Si substrate may include a sensor for measuring the HMS, such as, for example, a capacitive coupling circuit. Additionally, or alternative, the one or more active electronic components on the Si substrate may include one or more portions of the servo controller itself.

In some embodiments, the magnetic data recording and reading surface of the disk is devoid of any overcoat or lubricant layers. In some embodiments, the magnetic transducer of the read/write head is devoid of any overcoat or lubricant layers. Yet still, in other embodiments, both the disk surface and magnetic transducer are devoid of any overcoat or lubricant layers.

In some embodiments, the z-axis actuator may include a rigid frame including an elongate body having a first end, an opposing second end, and a channel extending between the first and second ends and a head assembly positioned within the rigid frame and configured to control the flying height of the magnetic transducer of the read/write head relative to the disk surface during disk rotation. The head assembly may include an electromechanical member positioned within the channel and adjacent to the first end of the elongate body of the frame. The electromechanical member may be configured to receive the control signal from the servo controller to cause the electromechanical member to contract and expand along a length of the channel. The head assembly may further include a suspension arm positioned within the channel between the electromechanical member and the second end of the elongate body of the frame.

The suspension arm may include a deformable portion configured to transition between a substantially planar configuration and a buckled configuration in response to associated contraction and expansion of the adjacent electromechanical member. When in the buckled configuration, the deformable portion generally extends in a direction away from the remainder of the first suspension arm and the frame. The read/write head is coupled to the deformable portion of the suspension arm. Thus, upon transition of the deformable portion from the planar configuration to the buckled configuration, the read/write head is configured to move in a substantially orthogonal direction away from the suspension arm and the frame and towards the data reading and recording surface of the disk. When the deformable portion transitions from the buckled configuration to the planar configuration, the read/write head is configured to move in a substantially orthogonal direction away from the data reading and recording surface of the disk and towards the suspension arm and the frame.

The deformable portion of the suspension arm may include a shape memory material having a default, substantially planar shape, and may be configured to bend in an outward direction upon linear force applied thereto from the electromechanical member when electromechanical member expands and return to the default, substantially planar shape upon removal of the linear force when the electromechanical member contracts.

In other embodiments, the z-axis actuator may include a rigid frame comprising an elongate body having a first end, an opposing second end, and a channel along a length thereof and an electromechanical member positioned within the channel and adjacent to the first end of the elongate body of the frame. The electromechanical member may be configured to receive the control signal from the servo controller to cause the electromechanical member to contract and expand along a length of the channel. The z-axis actuator may further include an L-shaped suspension arm having a short segment and a long segment having a distal-most end upon which the read/write head is coupled. The short segment may be directly coupled to a portion of the frame via a notched portion and positioned adjacent to the electromechanical member. The suspension arm may be configured to transition between a substantially planar configuration and a bent configuration in response to associated contraction and expansion of the adjacent electromechanical member. When in the bent configuration, the suspension arm is bent at the notched portion of the short segment and the distal-most end of the long segment extends in a direction away from the frame. Accordingly, upon transition of the suspension arm from the planar configuration to the bent configuration, the read/write head is configured to move in a direction away from the frame and towards the data reading and recording surface of the disk. When the suspension arm transitions from the bent configuration to the planar configuration, the read/write head is configured to move in a direction away from the data reading and recording surface of the disk and towards the frame.

The notched portion is arranged so as to prevent the suspension arm from bending inwardly and permit the suspension arm to only bend in an outward direction upon linear force applied thereto from the electromechanical member when electromechanical member expands.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

Figure 1:
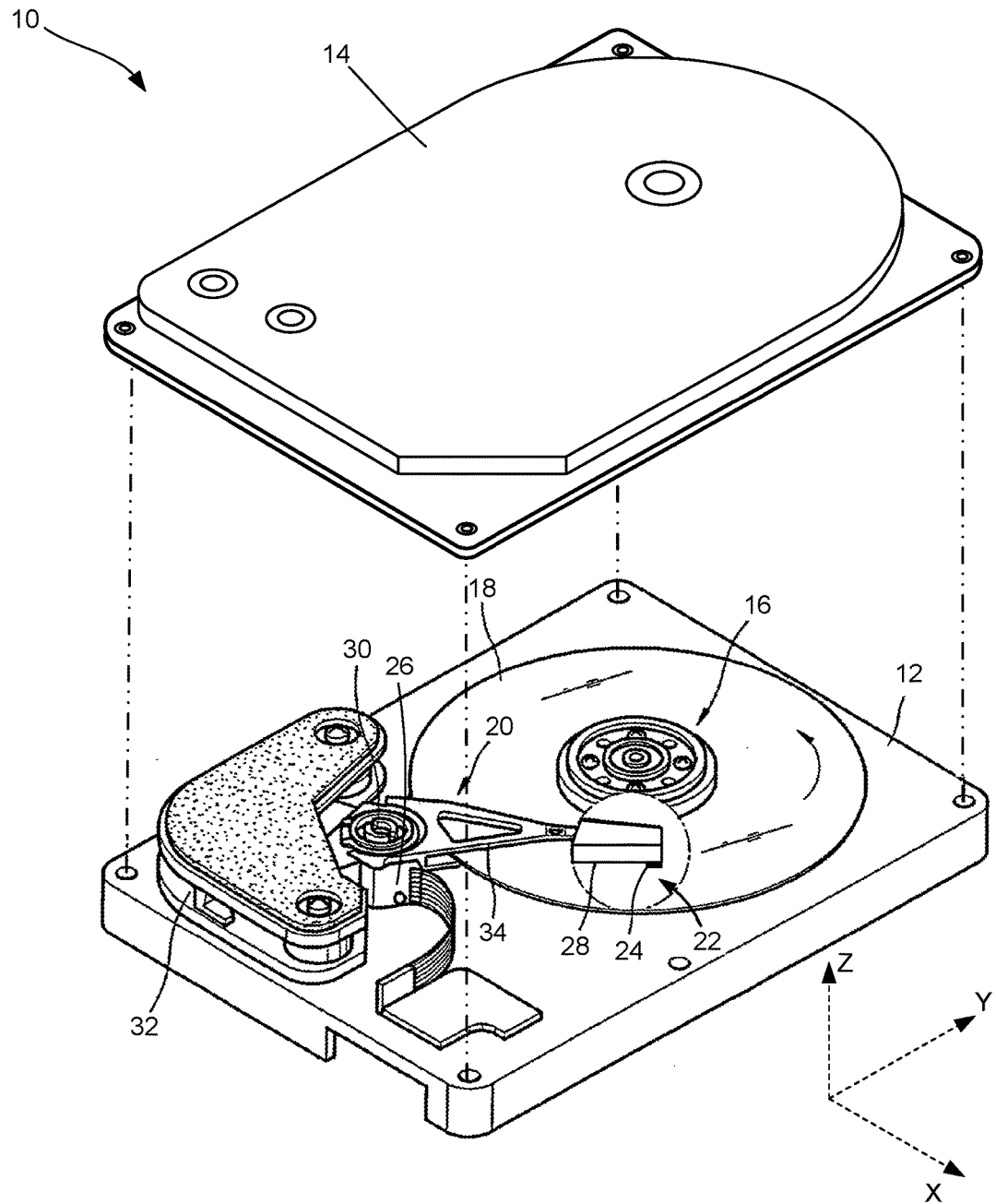
FIG. 1 is a exploded view of an exemplary embodiment of a hard disk drive (HDD) in which a system consistent with the present disclosure may be incorporated.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present disclosure is generally directed to a system for providing reduced head-media spacing (HMS) in a hard disk drive (HDD) to achieve increased areal bit density for improved data transfer (e.g., reading and writing of data). In particular, the system of the present disclosure is configured to monitor the position of a read/write head relative to a disk surface and actively control positioning of the read/write head within a relatively tight HMS tolerance (e.g., between 1.0 nm and 10.0 nm, and, in some instances, 4.3 nm) between the head and disk surface while ensuring contact between the head and disk surface is prevented.

As used herein, "HMS" generally refers to the total distance between the read/write head and the disk surface. Accordingly, HMS may include, for example, not only the flying height of the read/write head relative to the disk surface, but also thicknesses of all coating or lubrication layers on either of the read/write head or disk surface. As will be described in greater detail herein, the system of the present disclosure allows for read/write heads and disk surfaces to be bare (e.g., devoid of any hard coating or lubrication layers). Accordingly, in some embodiments, the HMS between the read/write head and disk surface of a system consistent with the present disclosure may generally refer to the distance between a bare magnetic transducer of the read/write head and the bare magnetic data recording and reading surface of the disk. It should be noted, however, that in some embodiments, the disk and read/write head surfaces may include a significantly small amount of hard coating or lubrication layer (e.g., coating or layer having a thickness in the range of 0.1 nm to 2.0 nm). Thus, HMS includes the distance between the magnetic transducer of the read/write head and the disk surface including any thin hard coating or lubrication layer included on either the magnetic transducer or disk surface.

The system of the present disclosure replaces the conventional ABS design with a fully active actuator assembly including a z-axis actuator configured to support and move a read/write head in a direction substantially orthogonal relative to the disk surface. In other words, the z-axis actuator is configured to move the read/write head in a z-direction towards or away from the disk surface. The z-direction is substantially parallel to a z-axis oriented substantially orthogonal to the disk surface. The z-axis may generally be parallel to the axis of rotation of the disk.

The system includes a controller configured to monitor the HMS between the read/write head relative to the disk surface and transmit control signals to the z-axis actuator to cause movement of the read/write head in the event that the read/write head is positioned outside of a desired HMS range of values. In particular, the controller may be configured to receive and process measurement data, including one or more measurements of a flying height of the read/write head relative to the disk surface during disk rotation. Based on the measurement data, the controller may be configured to determine the position of the read/write head and whether the position of the read/write head falls outside of a set HMS range of values. Thus, the controller may be referred to herein as a "servo controller", in that the controller is a servomechanism utilizing error-sensing negative feedback to correct the performance of a mechanism (e.g., adjust the position of the read/write head). Accordingly, the system of the present disclosure is configured to actively control the flying height of the head above the disk surface at all times, thereby ensuring that the head remains within a desired HMS range during operation while also ensuring that the head never makes contact with the disk surface.

The system of the present disclosure provides numerous advantages. For example, by providing fully active control over a z-axis actuator and ensuring that contact between the read/write head and disk surface never occurs, the protective hard coating and lubrication layers customarily applied to the disk and head surfaces can be eliminated, or, at the very least, the disk and read/write head surfaces may include a significantly small amount of hard coating or lubrication layer (e.g., coating or layer having a thickness in the range of 0.1 nm to 2.0 nm). The elimination of, or reduction in the thickness of, such layers results in a significant reduction in the HMS between the head and disk surface, thereby allowing for increased areal density to be achieved. Additionally, since all physical contact between the head and the disk surface is eliminated, a HDD incorporating the system of the present disclosure will have reduced wear and tear and have a much longer operating life than current hard disk drive units.

Additionally, because the system does not rely on an ABS design, air within the HDD is no longer required as the actuator design of the present invention does not rely on aerodynamic forces to maintain the flying height of the head. Accordingly, a low air pressure environment, including a zero, or near-zero, air pressure may be maintained within the HDD enclosure, thereby eliminating substantially all aerodynamic drag and turbulence that are major causes of head and disk surface contact, disk flutter, TMR, and power consumption. Additionally, or alternatively, in some embodiments, any oxygen remaining within the HDD enclosure may be purged and replaced with an inert gas, such as nitrogen or helium, which may improve the longevity and operation of components within the HDD enclosure. For example, typical HDDs may include oxygen within the enclosure, which can lead to oxidation of the HDD components which may affect performance and reliability. Accordingly, purging the HDD enclosure of oxygen and replacing with an inert gas prevent HDD components from being exposed to oxygen.

Another advantage of eliminating the ABS design relates to the fact that the read/write heads consistent with the present disclosure do not require air bearing sliders, which can be the single-most expensive component of an HDD due to the time-intensive manufacturing processes and costs involved. The system of the present invention allows for the manufacture of heads using a silicon (Si) substrate from a Si wafer, wherein such a material is much more compatible with most common semi-conductor manufacturing processes and equipment. The system allows for large gains in magnetic head manufacturing efficiencies to be obtained by reducing the size of the head and increasing the number of heads that can be produced on any given Si substrate. Furthermore, by using a Si-based thin-film head, additional electronic circuitry and components may be added for improving performance, such as, for example, a pre-amplifier circuit for boosting the read/write head signal prior to transmission of the signal over a longer distance to a drive interface.

FIG. 1 is an exploded view of an exemplary embodiment of a hard disk drive (HDD) 10 in which a system consistent with the present disclosure may be implemented. The HDD 10 includes base or chassis 12 upon which components described herein may be positioned and fixed thereto, as well as a cover 14 configured to be fastened to the chassis 12 for covering and protecting components within the HDD 10. As will be described in greater detail herein, the chassis 12 and cover 14 may be hermetically sealed to one another via any known technique (e.g., adhesive, polymer strip or gasket, etc.) in that the interior of the HDD 10 provides a low air pressure environment, which may include a zero, or near-zero, air pressure environment.

The HDD 10 generally includes a spindle motor 16 for rotating one or more disks or platters 18 and an actuator assembly 20 for supporting one or more head assemblies 22, wherein one or more of the head assemblies 22 includes at least one read/write head 24 configured to write data to and/or read data from the disk 18.

The actuator assembly 20 includes a first actuator 26 and a second actuator 28. The first actuator 26 is configured to rotate about a pivot bearing 30 to sweep and position the head assembly 22 across a surface of the disk 18. In particular, the first actuator 26 is configured to move the head assembly 22 in both x- and y-directions relative to the disk surface, as indicated by the three-dimensional Cartesian coordinate system in FIG. 1. The x- and y-directions correspond to the x-axis and y-axis of the coordinate system, respectively, and thus generally extend along an x,y plane that is substantially parallel to the surface of the disk 18. Thus, in some embodiments, the first actuator 26 may include, for example, a conventional rotary arm actuator configured to move the head assembly 22 radially with respect to the axis of rotation of the disk 18 in order swing the head 24 in arcuate paths across the magnetically encoded tracks of the disk 18. The first actuator 26 may operate generally as a result of input from a motor 32 (e.g., a voice coil motor or the like). In other embodiments, the first actuator 26 may include a belt and pulley arrangement, such as those arrangements described in U.S. Pat. Nos. 9,058,825, 9,190,087, 9,293,163, as well as pending U.S. patent application Ser. No. 15/043,095, the contents of each of which are hereby incorporated by reference herein in their entireties.

The actuator assembly 26 includes an arm 34 rotatably coupled to the pivot bearing 32, wherein the second actuator 28 is coupled to the support arm 34. The second actuator 28 is configured to support the head assembly 22 and further move the read/write head 24 in a direction substantially orthogonal relative to the surface of the disk 18. In particular, the second actuator 28 is configured to move the read/write head 24 in a z-direction towards or away from the disk surface. The z-direction corresponds to the z-axis (shown in the coordinate system) that is orthogonal to the surface of the disk 18. In particular, the z-axis corresponds to the axis of rotation of the disk 18. Accordingly, the second actuator 28 will be referred to as the "z-axis actuator 28" in the following description. As will be described in greater detail herein, the z-axis actuator 28 of the present invention may include different embodiments, such as a buckling arm design (shown in FIGS. 4A-4B, 5A-5B) or a bending arm design (shown in FIGS. 8A and 8B), each of which are configured to achieve movement of the read/write head 24 in a z-direction with precision and accuracy. As will be described in greater detail herein, the z-axis actuator 28 is configured to communicate with a controller and, in response to control signals from the controller, move the read/write head so as to maintain the read/write head a desired distance from the disk surface.

Figure 2:
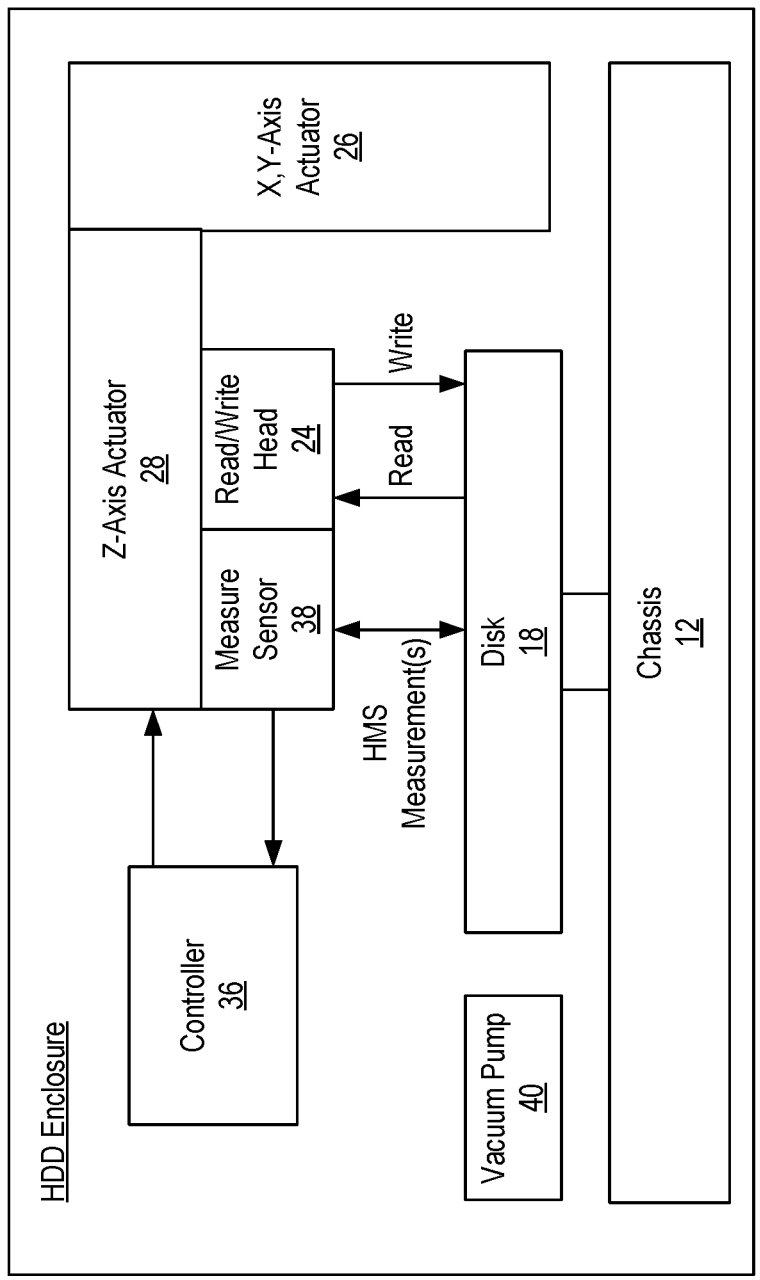
FIG. 2 is a block diagram illustrating a system consistent with the present disclosure and configured to be incorporated into the HDD of FIG. 1.

FIG. 2 is a block diagram illustrating a system consistent with the present disclosure and configured to be incorporated into the HDD 10. As shown, the system generally includes a disk 18 having a magnetic data recording and reading surface. In some embodiments, the disk surface may be bare. In other words, the disk surface may be devoid of any overcoat or lubricant layers. The system further includes at least a read/write head 24 having a magnetic transducer, wherein, in some embodiments, the magnetic transducer may be bare (i.e., the magnetic transducer is devoid of any overcoat or lubricant layers). It should be noted, however, that in some embodiments, either the disk surface of the magnetic transducer, or both, may include a significantly small amount of hard coating or lubrication layer (i.e., a coating or layer having a thickness in the range of 0.1 nm to 2.0 nm). In some embodiments, at least one of the disk surface and magnetic transducer may include a single layer of graphene, for example, which may have a thickness of approximately 0.35 nm to 1.0 nm.

The magnetic transducer is configured to read data from or write data to the magnetic surface of the disk 18. The system further includes a z-axis actuator 28 coupled to the read/write head 24 and configured to control movement of the read/write head 24 in a substantially orthogonal direction relative to the surface of the disk 18. The system further includes a controller 36 in electrical communication with the z-axis actuator 28 and configured to monitor positioning of the read/write head 24 relative to the disk surface during rotation of the disk 18. The controller is configured to cause the z-axis actuator 28 to adjust a position of the read/write head 24 to prevent head-media spacing (HMS) between the magnetic transducer and the magnetic data recording and reading surface from falling outside of a desired range of HMS values. In other words, the controller is configured to monitor the HMS between the read/write head 24 relative to the disk surface and transmit control signals to the z-axis actuator 28 to cause movement of the read/write head 24 in the event that the read/write head is positioned outside of a set range of HMS values. Thus, the controller 36 may be referred to herein as a "servo controller 36", in that the controller is a servomechanism utilizing error-sensing negative feedback to correct the performance of a mechanism (e.g., adjust the position of the read/write head 24).

In particular, the servo controller 36 may be configured to receive and process measurement data from a sensor 38, wherein the measurement data may include one or more measurements of a flying height of the read/write head 24 relative to the disk surface during disk rotation. In particular, the sensor 38 may be configured to measure the distance between the magnetic transducer and the disk surface (e.g., the HMS measurements) and provide such measurements to the servo controller 36 to be processed. In some embodiments, the sensor 38 includes a capacitive coupling device. In some embodiments, the read/write head 24 is configured to measure the distance between the magnetic transducer and the disk surface via a capacitive coupling arrangement between the read/write head 24 and the disk surface. The measurement data may be obtained via measuring capacitive coupling between the read/write head and the disk surface and/or by comparing the amplitude of different harmonic read signals generated from known servo patterns, or even from random user data, for example.

The sensor 38 is then configured to transmit the measurement data to the servo controller 36. In turn, the servo controller 36 is configured to process the measurement data to determine the position of the read/write head and to further determine whether the read/write head 24, specifically the magnetic transducer, falls outside of a set range of HMS values.

In some embodiments, the set range of HMS values may be from 1.0 nm to 10.0 nm. Accordingly, in the event that the magnetic transducer falls outside of the 1.0 nm to 10.0 nm range, the servo controller 36 is configured to generate and transmit a control signal to the z-axis actuator 28 to thereby cause the actuator 28 to move the read/write head 24 to a position such that the magnetic transducer falls within the 1.0 nm to 10.0 nm range. In some embodiments, the range of HMS values may be narrower, such as from 4.0 nm to 8.0 nm. Yet further still, in some embodiments, the HMS value may be set to approximately 4.3 nm. Thus, the servo controller 36 is configured to monitor the read/write head 24 position during operation of the HDD and generate and transmit one or more control signals causing the z-axis actuator 28 to move the read/write head 24, if necessary, so as to maintain a position of the magnetic transducer within the set HMS 4.3 nm value. Accordingly, the system of the present disclosure is configured to actively control the flying height of the head above the disk surface at all times, thereby ensuring that the head remains within a desired HMS range during operation while also ensuring that the head never makes contact with the disk surface.

As previously described, the system of the present disclosure does not rely on an ABS design. Accordingly, air within the HDD 10 is no longer required as the z-axis actuator 28 design of the present invention does not rely on aerodynamic forces to maintain the flying height of the head. Accordingly, a low air pressure environment, including a zero, or near-zero, air pressure may be maintained within the HDD 10 enclosure, thereby eliminating substantially all aerodynamic drag and turbulence that are major causes of head and disk surface contact, disk flutter, TMR, and power consumption. However, in some embodiments, it may be advantageous to maintain a low, but non-zero, air pressure within the HDD enclosure so as to aid in heat transfer between the different components of the HDD 10.

In order to maintain a low, near-zero, or zero air pressure environment, the chassis 12 and cover 14 of the HDD 10 may be hermetically sealed to one another via any known technique (e.g., adhesive, polymer strip or gasket, etc.). The hermetic seal will generally prevent atmospheric air from leaking back into the enclosure. However, the system may further include a vacuum pump 40, for example, configured to maintain the desired low air pressure despite any leaks within the HDD enclosure.

Additionally, or alternatively, in some embodiments, any oxygen remaining within the HDD enclosure may be purged and replaced with an inert gas, such as nitrogen or helium, which may improve the longevity and operation of components within the HDD enclosure. For example, typical HDDs may include oxygen within the enclosure, which can lead to oxidation of the HDD components which may affect performance and reliability. Accordingly, purging the HDD enclosure of oxygen and replacing with an inert gas prevent HDD components from being exposed to oxygen.

Figure 3:
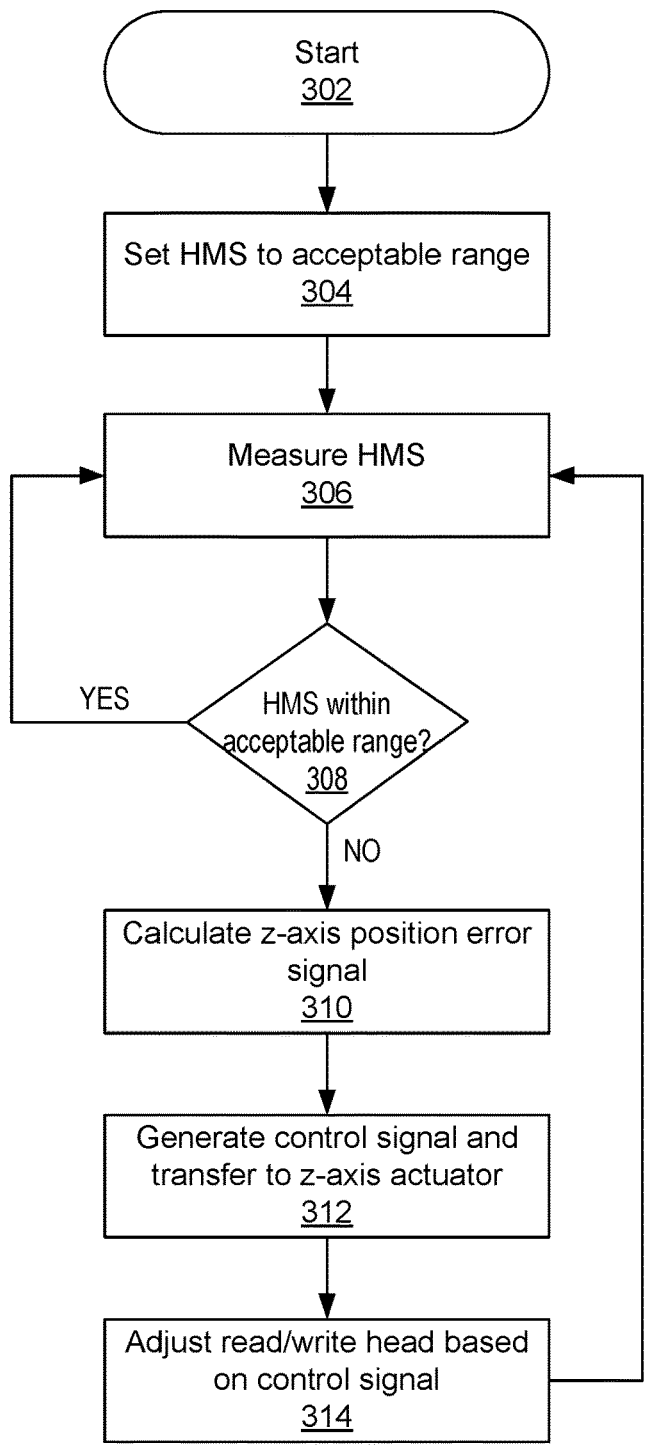
FIG. 3 is a flow diagram illustrating one embodiment of a method for monitoring and actively controlling the position of a read/write head relative to a disk surface using a system consistent with the present disclosure.

FIG. 3 is a flow diagram illustrating one embodiment of a method 300 for monitoring and actively controlling the position of a read/write head relative to a disk surface using a system consistent with the present disclosure. The method 300 includes setting the HMS to an acceptable range (operation 304). For example, the servo controller 36 may be used to set a desired range of HMS values in which the read/write head 24 is to remain. The range of HMS values may include 1.0 nm to 10.0 nm, and, more particularly, from 4.0 nm to 8.0 nm. In some embodiments, an approximate HMS value may be set, such as, for example, 4.3 nm. The method 300 further includes obtaining one or more HMS measurements (operation 306). As previously described, the system may include sensor 38 configured to collect HMS measurements (e.g., measurements of the distance between the magnetic transducer and the disk surface) via a capacitive coupling device. In alternative embodiments, the read/write head 24 may be configured to measure the distance between the magnetic transducer and the disk surface via a capacitive coupling arrangement.

A determination may then be made in operation 308 as to whether the HMS measurement falls within the set range of (or approximate) HMS values. At this point, the servo controller is configured to process the HMS measurement data and, based on a comparison of the HMS measurement data with the set range of (or approximate) HMS values, determine whether the magnetic transducer of the read/write head 24 is positioned accordingly. If it is determined in operation 308 that the magnetic transducer of the read/write head 24 is positioned within the set range of HMS values, then system continues to obtain measurement data (operation 306). However, if it is determined in operation 308 that the magnetic transducer of the read/write head 24 is positioned outside of the set range of HMS values, then servo controller is configured to determine the appropriate correction required, specifically calculating a z-axis position error signal (operation 310). For example, the servo controller may be configured to calculate an exact distance that the head must be moved so as to fall back within the set range of HMS values.

The servo controller is then configured to generate a control signal for controlling operation of the z-axis actuator (operation 312) to cause movement of the head to a corrected position so as to place the magnetic transducer back within the set range of HMS values (operation 314). For example, if it is determined that the magnetic transducer is positioned below the minimum value of the HMS range (e.g., below 1.0 nm), then the control signal causes the z-axis actuator to move of the read/write head in direction away from the disk surface to position the magnetic transducer within the HMS range. Similarly, if it is determined that the magnetic transducer is positioned above the maximum value of the HMS range (e.g., above 10.0 nm), the control signal causes the z-axis actuator to move the read/write head in direction towards the disk surface to position the magnetic transducer within the HMS range. Upon adjusting the head, then system continues to obtain measurement data (operation 306).

It should be noted that the servo controller 36 is configured to monitor and actively control the position of a read/write head 24 relative to the disk surface in a continual manner. In particular, the servo controller 36 may be configured to receive and process HMS measurement data periodically, such as at a relatively high frequency over a given period of time. In some embodiments, the servo controller 36 may be configured to operate (i.e., monitor and control read/write head 24 position) at 10 kilohertz (10,000 times per second).

While FIG. 3 illustrates method operations according various embodiments, it is to be understood that in any embodiment not all of these operations are necessary. Indeed, it is fully contemplated herein that in other embodiments of the present disclosure, the operations depicted in FIG. 3 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

One of the advantages of eliminating the ABS design relates to the fact that the read/write head 24 does not require an air bearing slider, which can be the single-most expensive component of an HDD due to the time-intensive manufacturing processes and costs involved. Air bearing sliders are generally made from aluminum oxide/titanium carbide ($Al_2O_3$/TiC), as this material is ideal for making sliders with smooth faces and sharp edges. However, such material is incompatible with most common semi-conductor manufacturing processes and, as a result, these manufacturing processes must be altered to accommodate the aluminum oxide/titanium carbide material, which is time intensive and results a loss of useable space on the substrate. For example, the process of manufacturing air bearing sliders may involve depositing a thin-film magnetic transducer, using a lithographic process, on a 200 mm diameter $Al_2O_3$/TiC wafer. The wafer is then partitioned into pieces that will eventually become the sliders (approximately 1 mm×0.8 mm×0.3 mm). The process of cutting, polishing, and etching the air bearing sliders from the wafer includes numerous steps that are harsh and often suffer from low yield due to likely damage that occurs to the thin film transducers. Furthermore, much of the real-estate on the wafer is lost to the cutting blades since the wafers cannot be thinned to less than 1 mm (the length of a single slider).

In some embodiments, the read/write head 24 may include a silicon (Si) substrate configured for supporting the magnetic transducer. The system of the present invention allows for the manufacture of heads using a Si substrate from a Si wafer, wherein such a material is much more compatible with most common semi-conductor manufacturing processes and equipment. The system of the present disclosure allows for large gains in magnetic head manufacturing efficiencies to be obtained by reducing the size of the head and increasing the number of heads that can be produced on any given Si substrate in that the Si wafer has a size of approximately 300 nm, which is much greater than a typical 200 nm size of an $Al_2O_3$/TiC wafer. Thus, the larger 300 mm Si wafers can hold a lot more magnetic transducer heads, which can be made even smaller than a slider face. In fact, since the transducer is approximately half a micron in size, the only lower limit on it size is that imposed by the dexterity of the automated handling machinery. Furthermore, prior to cutting, the Si wafer can be thinned for easier cutting and in order to minimize the amount of surface lost to the cutting blade. Accordingly, the process of manufacturing a head on a Si substrate is much more efficient than manufacturing of air bearing sliders. The larger 300 mm Si wafers have much greater surface area than the 200 mm $Al_2O_3$/TiC wafers. Furthermore, the thin film heads have a smaller foot print than a slider face, and can therefore be packed much more tightly on a substrate. Additionally, a standardized packaging process will have virtually no yield losses with the Si substrate, in contrast to the air bearing slider shaping process.

The Si substrate may be configured to support one or more active electronic components configured to be coupled to, or in communication with, the magnetic transducer. For example, in one embodiment, the one or more active electronic components may include a pre-amplifier positioned on the Si substrate and in communication with a read element of the magnetic transducer. The pre-amplifier is configured to amplify read signals from the read element of the magnetic transducer so as to boost the read signal prior to transmission of the signal over a longer distance. The advantage of including a pre-amplifier adjacent to the read element is that the read element can be a simple inductive element instead of a complex GMR sensor, which would greatly simplify the manufacturing of the magnetic transducer. Additionally, or alternatively, the Si substrate may include a sensor for measuring the HMS, such as, for example, a capacitive coupling circuit. Additionally, or alternative, the one or more active electronic components on the Si substrate may include one or more portions of the servo controller itself. Other possible circuits that can be integrated with the magnetic transducer include, but not limited to, timing circuitry and buffer memory.

As previously described, the z-axis actuator 28 of the present invention may include different embodiments, such as a buckling arm design (shown in FIGS. 4A-4B, 5A-5B) or a bending arm design (shown in FIGS. 8A and 8B), each of which are configured to achieve movement of the read/write head 24 in a z-direction with precision and accuracy.

Figure 4A:
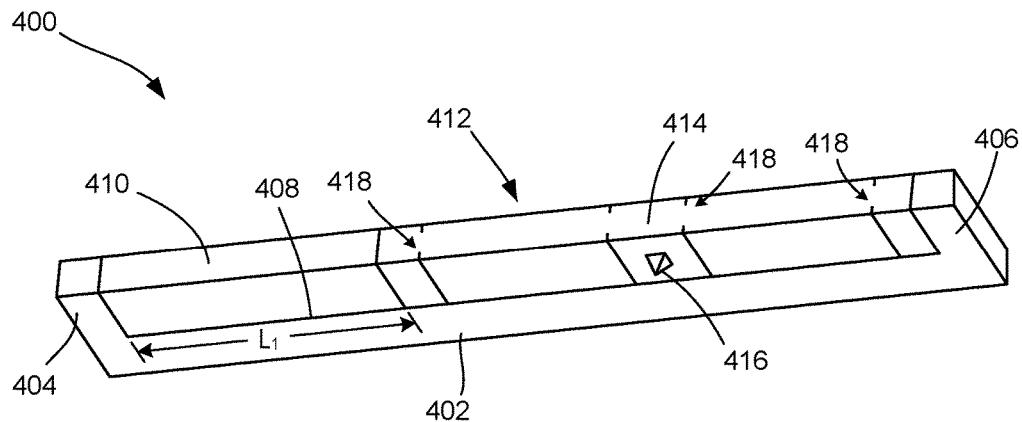
FIGS. 4A and 4B are perspective and side views of one embodiment of a head assembly of a z-axis actuator compatible with the system of FIG. 2 illustrating a portion of the head assembly in a substantially planar configuration.
Figure 4B:
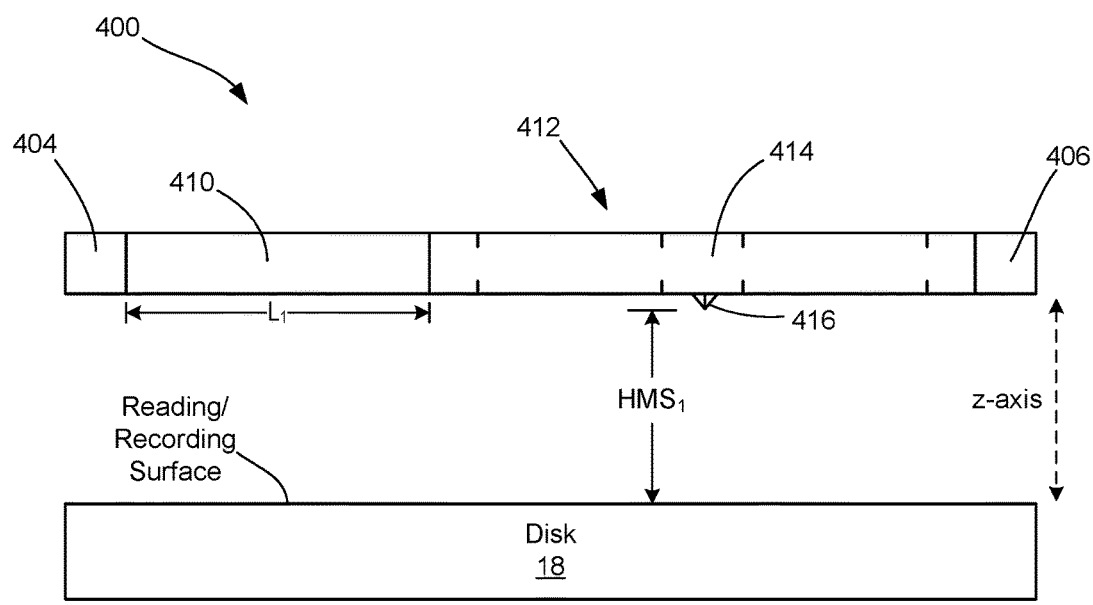

FIGS. 4A and 4B are perspective and side views of one embodiment of a z-axis actuator assembly 400 having the buckling arm design and further illustrating a portion of a head assembly in a substantially planar configuration. The actuator 400 generally includes a rigid frame having an elongate body 402 having a first end 404, an opposing second end 406, and a channel extending between the first and second ends 408. The actuator assembly 400 further includes a head assembly positioned within the rigid frame and configured to control the flying height of the magnetic transducer of the read/write head relative to the disk surface during disk rotation.

The head assembly generally includes an electromechanical member 410 and a suspension arm 412. The electromechanical member 410 is positioned within the channel 408 and adjacent to the first end 404 of the elongate body of the frame. The suspension arm 412 is positioned within the channel 408 between the electromechanical member 410 and the second end 406 of the elongate body 402 of the frame. The electromechanical member 410 is configured to receive the control signal from the servo controller 36 to cause the electromechanical member 410 to contract and expand along a length of the channel 408. For example, the electromechanical member 410 may include a piezoelectric element. Accordingly, the control signal may include an electrical current in which the electromechanical member 410 expands. Thus, the electromechanical member 410 generally has a first length $L_1$, and, upon receiving a control signal including an electrical current, may then expand to a second length $L_2$ (see FIGS. 5A and 5B) greater than the first length $L_1$.

Figure 5A:
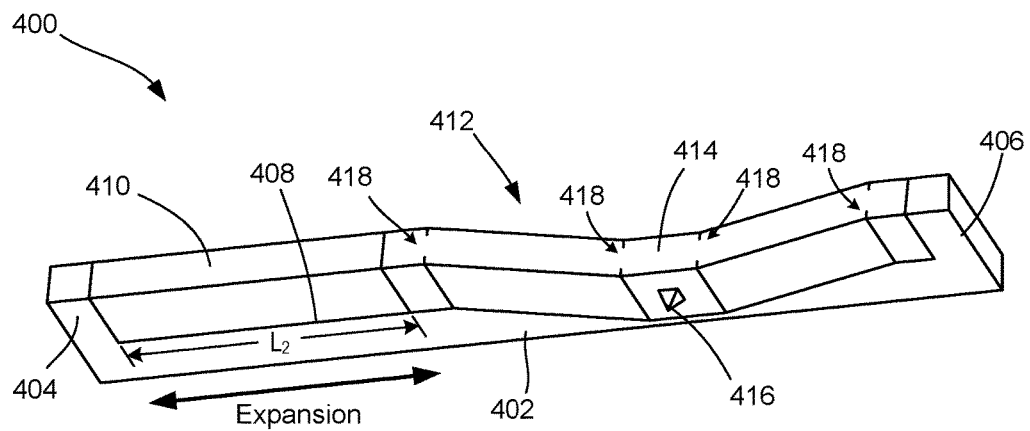
FIGS. 5A and 5B are perspective and side views of the head assembly of FIGS. 4A and 4B in a buckled configuration illustrating movement of the read/write head towards a disk surface for reducing HMS between the read/write head and disk surface.
Figure 5B:
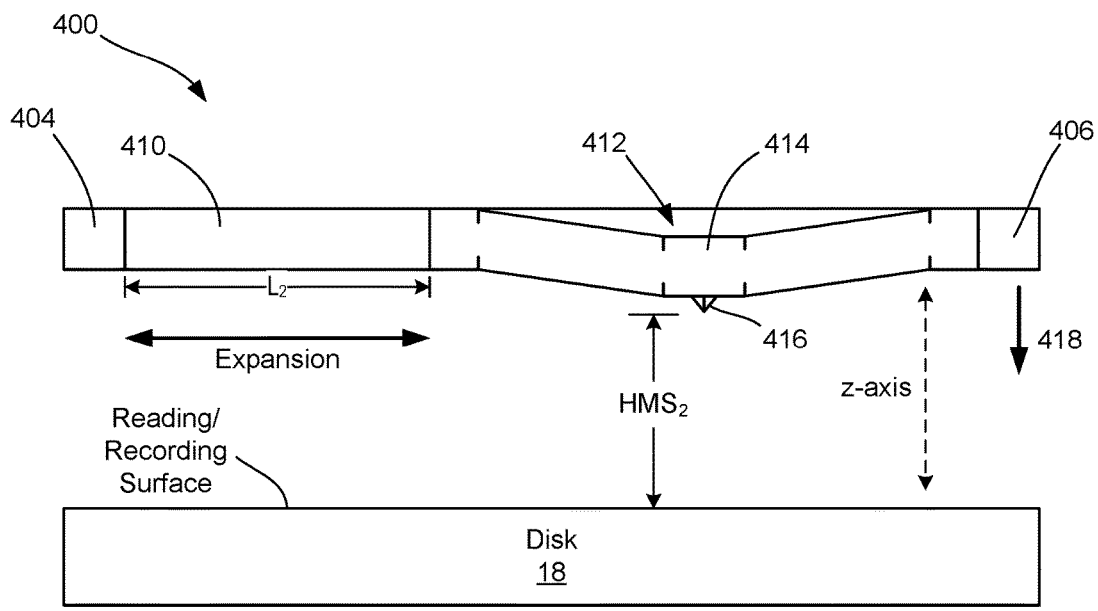

The suspension arm 412 includes a deformable portion 415 configured to transition between a substantially planar configuration (shown in FIGS. 4A and 4B) and a buckled configuration (shown in FIGS. 5A and 5B) in response to associated contraction and expansion of the adjacent electromechanical member 410. For example, as shown in FIGS. 5A and 5B, when in the buckled configuration, the deformable portion 414 extends in a direction away from the remainder of the suspension arm 412. As shown, a read/write head 416 is coupled to the deformable portion 414. Accordingly, contraction and expansion of the electromechanical member 410, which results in movement the deformable portion 414, further results in associated movement of the read/write head 416 coupled to the deformable portion 414.

The suspension arm 412 further includes a plurality of notches 418 across a width of the suspension arm 412 and along a length thereof. The plurality of notches 418 are arranged in such as manner so as to allow portions of the suspension arm 412 to bend relative to one another. For example, the notches are arranged so as to allow the deformable portion 414 to only buckle in an outward direction upon the application of the linear force applied thereto from the electromechanical member 410 upon expansion of the electromechanical member 410. The notches 418 may further be arranged so as to prevent the deformable portion 414 from buckling in an inward direction upon application of the linear force applied thereto from the expansion of the electromechanical member 410.

As shown in FIG. 4B, when the deformable portion is in the substantially planar configuration, the read/write head 416 is a first HMS distance ($HMS_1$) from a disk surface. However, upon expansion of the electromechanical member 410 in response to a control signal from the servo controller 36, the electromechanical may transition from the first length $L_1$ to the second length $L_2$ and apply a force against the suspension arm 412, resulting in transitioning of the deformable portion 414 from the planar configuration to the buckled configuration. When transitioning to the buckled configuration, as shown in FIG. 5B, the read/write head 416 moves in a substantially orthogonal direction away from the suspension arm 412 and the frame and towards the data reading and recording surface of the disk 18 (as indicated by arrow 418), thereby resulting in a second HMS distance $HMS_2$ from the disk surface, which is less than the first HMS distance $HMS_1$. In other words, expansion of the electromechanical member 410 results in reduction in the HMS between the read/write head 416 and disk surface.

The deformable portion 414 is further configured to return to the default planar configuration upon removable of the linear force to the suspension arm 412. In other words, upon contraction of the electromechanical member 410, the linear force from the electromechanical member 410 against the suspension arm 412 is lessened, resulting in the deformable portion 414 returning to the planar configuration. Accordingly, upon transition of the deformable portion 414 from the buckled configuration to the planar configuration, the read/write head 416 is configured to move in a substantially orthogonal direction away from the data reading and recording surface of the disk 18 and back towards the suspension arm 412 and frame. In other words, contraction of the electromechanical member 410 results in an increase in the HMS between the read/write head 416 and disk surface. Accordingly, the buckling arm actuator assembly 400 of FIGS. 4A-4B and 5A-5B allows for a fully active control of read/write head movement in a z-direction relative to the disk surface with precision and control via the servo controller.

The amount of movement in the z-axis required for the actuator to maintain the desired "flying" height may be equal to the z spacing tolerances between the platters and the planar (x, y) actuator supporting the z-axis actuator, which are a fixed amount, plus any run-time flutter in the platters and any axial runout in the fluid dynamic thrust bearing of the spindle motor, which are time varying. Reasonable fabrication and assembly tolerances are in the range of 0.02 mm, while disk fluttering values, in a vacuum, are estimated to be +/−2 micro-meters. The FDB thrust bearing typically contributes several micro-meters of runout albeit at a very low frequency. In some embodiments, the manufacturing tolerances, as well as any slack in the z-actuator head assembly, can be compensated for by the heating of the suspension arms. For example, the suspension arm 412 may be coupled to a heating element (e.g., conductive filament or the like) configured to receive an electrical current and, in turn, apply heat to the suspension arm 412. Upon receiving heat, the suspension arm 412 may expand within the channel 408 and cause the deformable portion 414 to further transition to the buckled configuration to make up for any slack between the electromechanical member 410 and suspension arm 412 and further advance the deformable portion 414, and thus the read/write head 416, to a position closer to the disk surface. The disk flutter is compensated for in part by the piezo actuation as well as the conventional thermal flying height control of the magnetic transducer.

Figure 6:
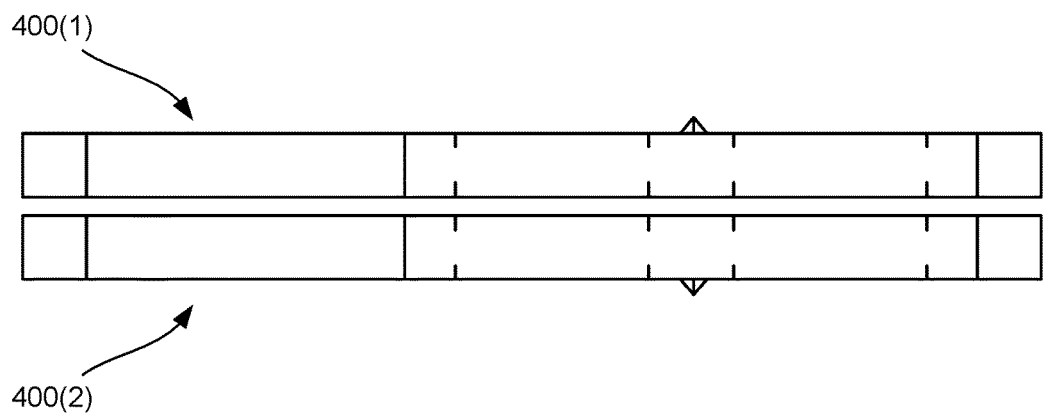
FIG. 6 is a side view of a dual head assembly including the head assembly of FIGS. 4A and 4B in a dual-design configuration.
Figure 7:
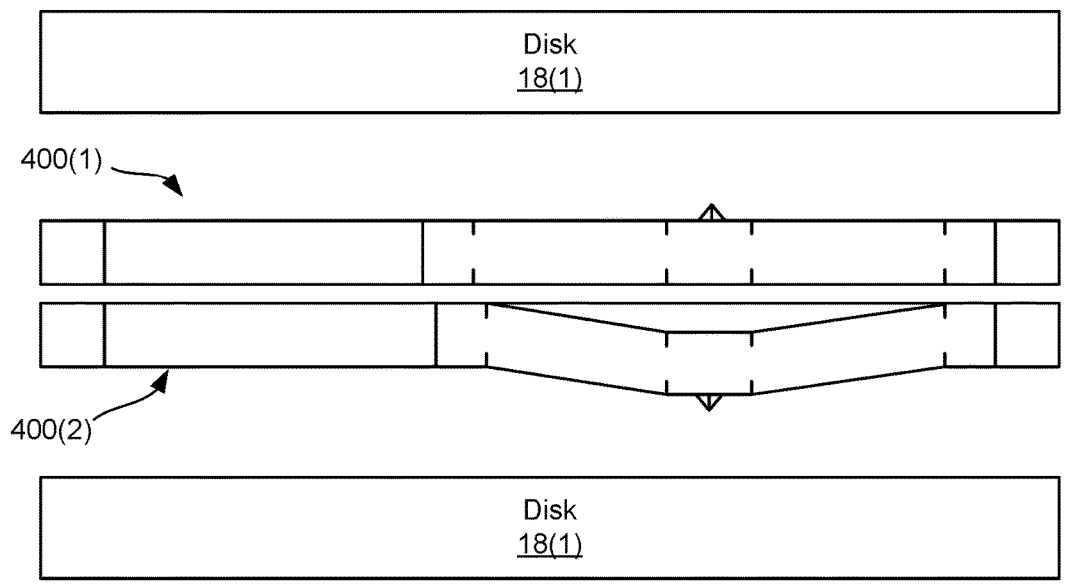
FIG. 7 is a side view of the dual head assembly of FIG. 6 positioned between two adjacent disks and illustrating one of the head assemblies in a buckled configuration.

FIG. 6 is a side view of an assembly including the head assembly of FIGS. 4A and 4B in a dual-design configuration. FIG. 7 is a side view of the dual-design configuration head assembly of FIG. 6 positioned between two adjacent disks and illustrating one of the head assemblies in a buckled configuration. As shown, the dual-head design includes first and second z-axis actuator assemblies 400(1) and 400(2) positioned substantially parallel with one another but configured to buckle in opposing directions. This dual-head design is particularly advantageous for placement in between two adjacent disks so as to allow the data reading and recording on associated opposing disk surfaces relative to the first and second read/write heads. For example, as shown in FIG. 7, the second assembly 400(2) is in the buckled configuration, while the first assembly 400(1) remains in the planar configuration. However, it should be noted that both assemblies 400(1) and 400(2) may operate simultaneously in either of the planar or buckled configurations.

Figure 8A:
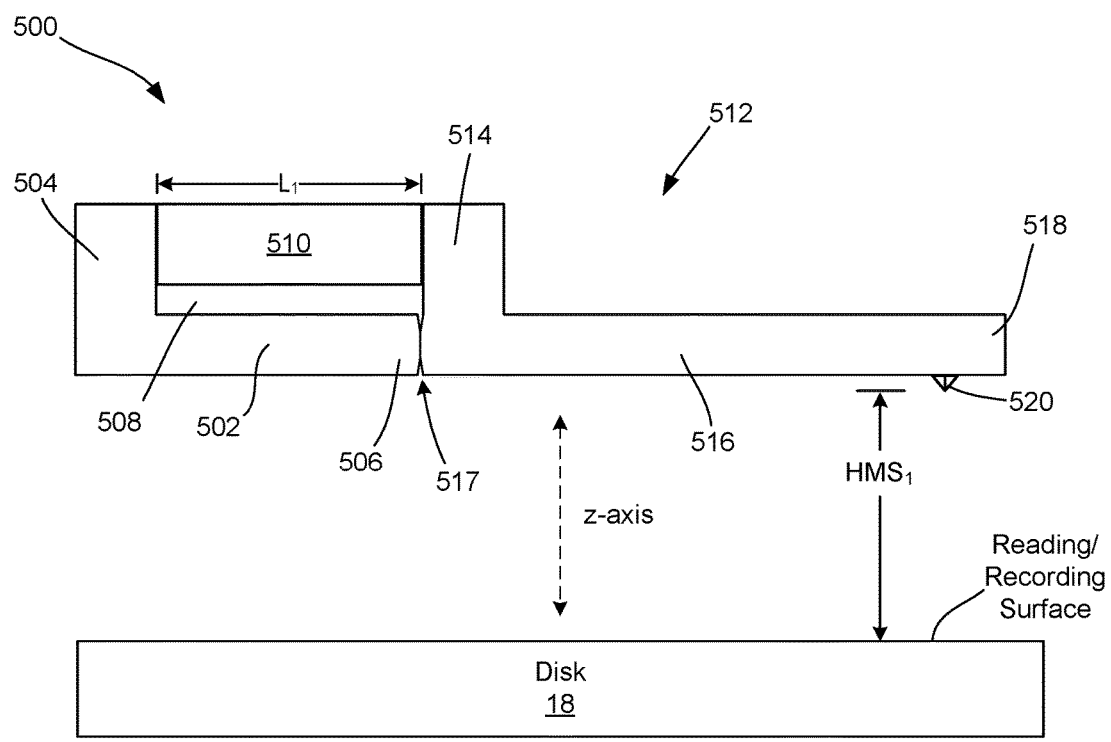
FIGS. 8A and 8B are side views of another embodiment of a head assembly of a z-axis actuator compatible with the system of FIG. 2 illustrating transitioning of a portion of the head assembly from substantially planar configuration to a bent configuration for movement of a read/write head towards a disk surface for reducing HMS between the read/write head and disk surface.
Figure 8B:
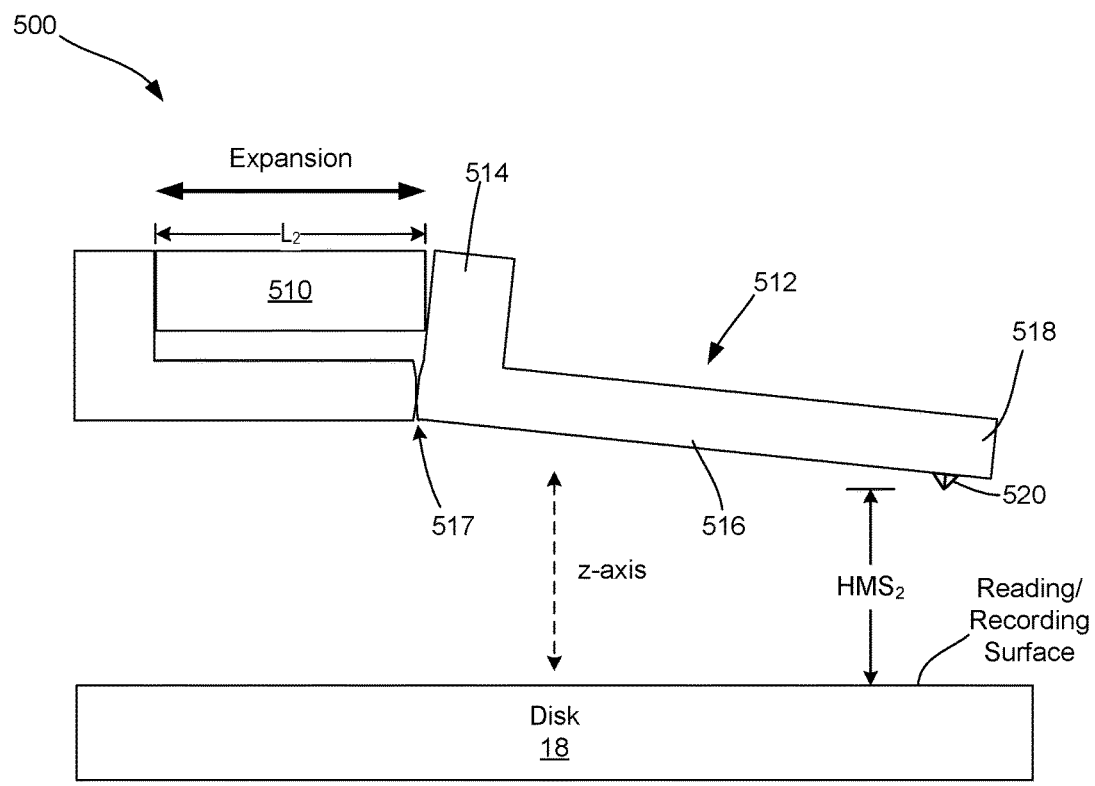

FIGS. 8A and 8B are side views of the bending arm design of a z-axis actuator assembly 500 compatible with the system of the present disclosure. As shown, the assembly 500 includes a rigid frame including an elongate body 502 having a first end 504, an opposing second end 506, and a channel along a length thereof 508. The assembly 500 further includes an electromechanical member 510 positioned within the channel 508 and adjacent to the first end 504 of the elongate body 502. Similar to electromechanical member 410 previously described herein, the electromechanical member 510 is configured to receive a control signal from the servo controller 36 so as to cause the electromechanical member 510 to contract and expand along a length of the channel 508, thereby changing a length of the electromechanical member 510 (e.g., transition between a first length $L_1$ and a second length $L_2$ greater than the first length $L_1$).

The assembly 500 further includes an L-shaped suspension arm 512 having a short segment 514 and a long segment 516. The short segment 514 is directly coupled to a portion of the frame and positioned adjacent to the electromechanical member 510 at a notched portion 517. The long segment 516 includes a distal-most end 518 to which a read/write head 520 is coupled. The suspension arm 512 is configured to transition between a substantially planar configuration (shown in FIG. 8A) and a bent configuration (shown in FIG. 8B) in response to associated contraction and expansion of the adjacent electromechanical member 510. In particular, upon expanding (e.g., increasing from the first length $L_1$ to the second length $L_2$), the electromechanical member 510 is configured to apply a linear force against the short segment 514 of the suspension arm 512, which results in bending of the suspension arm 512 at the notched portion 517 (which serves as the axis of rotation). The notched portion 517 may be arranged so as to allow the suspension arm 512 to only bend in an outward direction upon linear force applied thereto from the electromechanical member 510 when electromechanical member 510 expands. The notched portion 517 may further be arranged so as to prevent the suspension arm 512 from bending in an inward direction upon the application of linear force from the electromechanical member 510 when electromechanical member 510 expands.

When transitioning from the planar configuration to the bent configuration, the distal-most end 518 of the suspension arm 512 has the most dramatic amount of movement in a direction away from the frame. In turn, the read/write head 520 attached to the distal-most end 518 moves in a direction towards the data reading and recording surface of the disk 418, thereby decreasing the HMS distance between the read/write head 520 and disk surface.

The suspension arm 512 is further configured to return to the default planar configuration upon removable of the linear force to the short segment 514 from the electromechanical member 510. In other words, upon contraction of the electromechanical member 510, the linear force from the electromechanical member 510 against the short segment 514 is lessened, resulting in the suspension arm 512 bending in a direction away from the disk surface and returning to the planar configuration via the notched portion 517. Accordingly, upon transition of the suspension arm 512 from the bent configuration to the planar configuration, the read/write head 520 is configured to move in a direction away from the data reading and recording surface of the disk 18. In other words, contraction of the electromechanical member 510 results in an increase in the HMS between the read/write head 520 and disk surface.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A hard disk drive comprising:
a disk comprising a magnetic data recording and reading surface;
a read/write head for reading data from and writing data to the disk surface;
a z-axis actuator coupled to the head and for controlling movement of the head in a substantially orthogonal direction relative to the disk surface; and
a controller for monitoring a distance of the head relative to the disk surface and for maintaining the distance within a predetermined range, the controller employing robust control to ensure the head and the disk surface are prevented from coming into contact;
wherein one or both of the disk surface and the head is devoid of any overcoat or lubricant layer.

2. The hard disk drive of claim 1 wherein the robust control actively controls the head within a tolerance of between 1.0 nm and 10.0 nm.

3. The hard disk drive of claim 1 wherein the robust control comprises monitoring head-media spacing (HMS) between the head and the disk surface and also transmitting signals to the z-axis actuator to cause movement of the head.

4. The hard disk drive of claim 1 wherein the robust control comprises a servomechanism with error-sensing negative feedback to maintain the head within a range of 1.0 nm and 10.0 nm.

5. The hard disk drive of claim 1 wherein the z-axis actuator is rigidly coupled to the head.

* * * * *